(12) United States Patent
Shinozuka

(10) Patent No.: US 7,301,858 B2
(45) Date of Patent: Nov. 27, 2007

(54) OPTICAL HEAD DEVICE

(75) Inventor: Hiroshi Shinozuka, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 560 days.

(21) Appl. No.: 10/914,286

(22) Filed: Aug. 10, 2004

(65) Prior Publication Data

US 2005/0237901 A1  Oct. 27, 2005

(30) Foreign Application Priority Data

Apr. 27, 2004  (JP) ............... 2004-131676

(51) Int. Cl.
*G11B 7/00* (2006.01)
(52) U.S. Cl. ................................. 369/44.14
(58) Field of Classification Search ........ 369/44.11, 369/44.12, 44.14, 44.15, 44.2, 44.21, 44.16
See application file for complete search history.

(56) References Cited

U.S. PATENT DOCUMENTS 5,737,302 A * 4/1998 Kasahara ............... 369/118
5,930,224 A * 7/1999 Ikegame ............... 720/699

FOREIGN PATENT DOCUMENTS

| JP | 6-36320 | 2/1994 |
|---|---|---|
| JP | 2002-312963 | 10/2002 |

* cited by examiner

*Primary Examiner*—Nabil Hindi
(74) *Attorney, Agent, or Firm*—Pillsbury Winthrop Shaw Pittman LLP

(57) ABSTRACT

Disclosed is an optical head device including: an object lens; an actuator displacing the optical lens; a mirror which has a reflection plane to bend a direction of a light traveling on an optical axis of the object lens, and on a back of the reflection plane, a rear surface substantially parallel to the refection plane; and an optical base which has openings for incorporating the actuator and the mirror and which has a beam at a position opposed to the rear surface of the mirror.

6 Claims, 3 Drawing Sheets

OPTICAL HEAD DEVICE

CROSS-REFERENCE TO RELATED APPLICATION

This application is based upon and claims the benefit of priority from the prior Japanese Patent Application No. 2004-131676, filed on Apr. 27, 2004; the entire contents of which are incorporated herein by reference.

BACKGROUND

1. Field of the Invention

The present invention relates to an optical head device as an optical system component of an optical disc apparatus which reads or writes information from/to an optical disc, more particularly, to a preferred optical head device suitable for reducing size (thickness) of the optical disc device.

2. Description of the Related Art

In a field of the optical disc apparatus, that of a thinner structure is desired as a drive to be embedded in a compact personal computer such as a laptop personal computer. Consequently, as the optical head device to be embedded in the laptop personal computer, the structure of the optical head device is virtually limited to the one constituted with an object lens opposed to an optical disc (media), above and very close thereto a mirror which bends an optical path at 90 degree, opposed to the mirror a collimator lens, and opposed to the collimator lens a light-emitting element or a light detecting element. It is because without the mirror an optical system becomes long to a normal direction of a media surface and hampers reducing thickness. The optical system including the mirror is mounted on a member called an optical base, and constituted integrally.

Here, the object lens of the optical head device is required to be displaced, for the purpose of tracking, in a radial direction of the media, following a track on the media, and is further required to be displaced also in a normal direction of the media or in a direction around a rolling axis, following a warp or a tilt of the media. As a result, an actuator displacing the object lens in each direction is required very close thereto. In order to equip the actuator without hampering miniaturization, a shape of the optical base is often a frame, and an inside of this frame (opening) is provided as an area in which the actuator is positioned. Consequently, the optical head device miniaturized as a whole is available.

The actuator mounted within the opening of the optical base, on the other hand, becomes a source to bring the optical base a deformation (bend or torsion) by a vibration. Such a deformation becomes an obstacle for the optical system to soundly exert its function. In particular, when faster writing (for example, 24 times speed for a CD, 8 times speed for a DVD) comes to be required of the optical disc device, an operation speed of the actuator becomes faster, relatively increasing a side effect as being an unnecessary vibratory source.

At present, it is difficult to simultaneously pursuit reducing size/thickness and increasing stiffness of the optical base, and some solution is desired. Incidentally, an example of the structure of the optical head device is described in the following patent document 1. In this example, the actuator is mounted on the optical base without an inside frame area and ultimate reduction of thickness is not achieved.

[Patent document 1] Japanese Patent Laid-open Application No.2002-312963

SUMMARY

The present invention is made in consideration of the circumstances described above, and an object thereof is to provide an optical head device which enables simultaneous pursuit of reducing size/thickness and increasing mechanical stiffness of the optical head device, in the optical head device as an optical system component of an optical disc device which reads or writes information from/to an optical disc.

In order to solve the problem stated above, an optical head device according to the present invention includes: an object lens, an actuator displacing the object lens, a mirror which has a reflection plane to bend a direction of a light traveling on an optical axis of the object lens and on a back of the reflection plane a rear surface substantially parallel to the refection plane, and an optical base which has openings for containing the actuator and the mirror and which has a beam at a position opposed to the rear surface of the mirror.

More specifically, the optical base has a space for containing the actuator and the mirror, and on the back of the reflection plane of the mirror there exists the rear surface substantially parallel to the reflection plan. Consequently, a cross-sectional shape of the mirror is not a right triangle but is recessed on the rear surface side compared to the right triangle. Since the recess provides a new space, a beam is built newly in the new space, functioning as a part of the optical base. As a result, the space for containing the actuator and the mirror is divided by this beam, becoming small as an opening, and stiffness of the optical base is improved. Accordingly, simultaneous pursuit of reducing size/thickness of the optical head device and increasing mechanical stiffness as the optical head device can be achieved.

According to the present invention, in the optical head device as the optical system component of the optical disc device which reads or writes from/to the optical disc, simultaneous pursuit of reducing size/thickness of the optical head device and increasing mechanical stiffness as the optical head device can be achieved.

BRIEF DESCRIPTION OF THE DRAWINGS

FIG. 1A is a view from the side thereof and FIG. 1B is a view from above thereof.

FIG. 2A shows only an optical base, while FIG. 2B shows a case that each optical component is incorporated into the optical base.

Each of FIG. 3A

DETAILED DESCRIPTION

Description of Embodiments

Embodiments of the present invention will be described with reference to the drawings, but these drawings are presented only for the illustrative purpose and in no respect, are intended to limit the present invention.

As an aspect of the present invention, a cross-sectional shape of the beam of the optical base can be a right triangle having a hypotenuse substantially parallel to the rear surface of the mirror. The beam having a shape which simply follows the cross-sectional shape of the mirror is built.

As another aspect, the cross-sectional shape of the beam of the optical base can be a shape which is included in the right triangle having the hypotenuse substantially parallel to the rear surface of the mirror and at the same time a shape which has a recessed portion on a side of the hypotenuse of the right triangle. For the cross-sectional shape of the beam, a triangular shape having a hypotenuse substantially parallel to the rear surface of the mirror is at a disadvantage, when the optical base is molded, in terms of mold processing. Accordingly, the cross-sectional shape of the beam is designed to require little diagonal surface of a mold.

As an aspect, the beam of the optical base can be positioned apart from the rear surface of the mirror. A position of the mirror can be set unrelated to a position of the beam on the optical base.

As an aspect, the optical base can further have: a first light-emitting source to emit a light of a first wavelength which is positioned opposed to the object lens along a reflected light path of the mirror, and a second light-emitting source to emit a light of a second wavelength different from the first wavelength which is positioned opposed to the object lens along a reflected light path of the mirror and is positioned apart from the first light-emitting source. Presented as an example is an optical head device having a light source of wavelength 780 nm for a CD and a light source of wavelength 650 nm for a DVD so as to be correspondable to both, which is used for a so-called combo optical disc device.

As an aspect, the optical base may mainly contain zinc as material. Usage of zinc as material enables lower-cost manufacturing by way of molding. Other materials mainly containing aluminum or magnesium may be also used though cost performance thereof is lower.

Figure 1A:
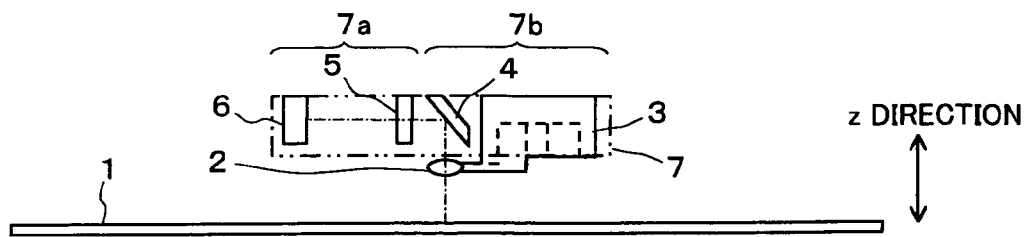
FIG. 1A and FIG. 1B are diagrammatic views which schematically show a structure of an optical head device according to an embodiment of the present invention.
Figure 1B:
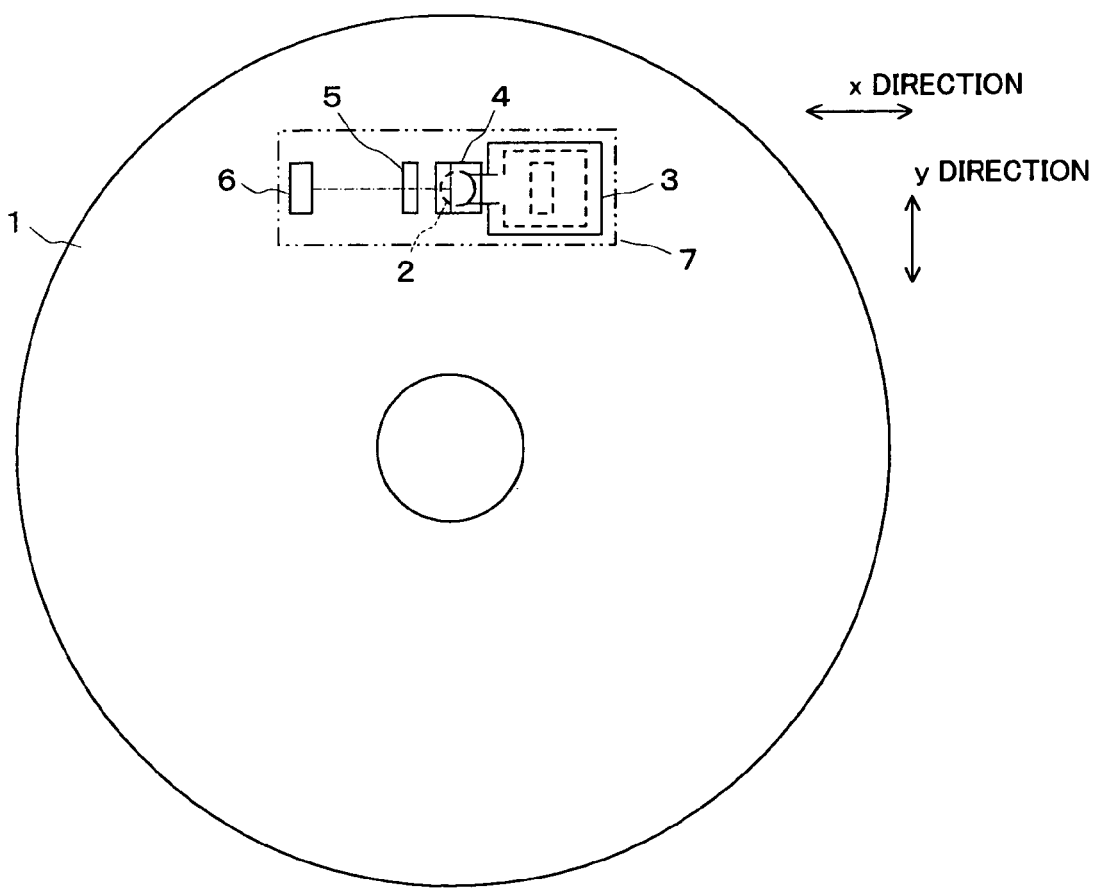

Based on the above, embodiments of the present invention will be hereinafter described with reference to the drawings. FIG. 1A and FIG. 1B are diagrammatic views which schematically show a structure of an optical head device according to an embodiment of the present invention. FIG. 1A is a view from the side and FIG. 1B is a view from above. In the embodiment shown in FIG. 1A and FIG. 1B, the structure is schematized, and operation and effect as a consequence thereof will be explained.

As shown in the drawings, in the optical disc apparatus the optical head device is generally positioned opposed to an optical disc 1. The optical head device has as its structure an object lens 2, an actuator 3, a mirror 4, a collimator lens 5, a light emitting/receiving part (light-emitting source, light-receiving part) 6, and an optical base 7, which integrally move in a radial direction (y-direction) of the optical disc 1. Note that in an actual optical disc device (especially one that is incorporated in a laptop personal computer and the like) the optical head device is commonly positioned at below side opposed to the optical disc 1 which is held horizontally, but here for convenience of explanation the optical head device is shown at upper side opposed to the optical disc 1.

The object lens 2 is positioned so that its optical axis is substantially vertical to a record surface of the optical disc 1, and has a function, in light irradiation on the record surface, to focus a collimated light in order to make a spot on the record surface. A reflected light from the record surface is led in the opposite direction of that in irradiation. The actuator 3 supports the object lens 2 so as to be displaceable against the optical base 7. The actuator 3 is, therefore in plain view, placed adjacent to the object lens 2 within the optical base 7. Directions of displacements of the lens 2 by the actuator 3 are, a focusing direction (z-direction), a tracking direction (y-direction), and a rolling direction (rolling direction around an x-axis). Displacements to the focusing direction is for making the spot, to the tracking direction is for following a track position on the record surface, and to the rolling direction is for responding to a tilt or a warp of the optical disc 1.

The mirror 4 being positioned opposed to the optical disc 1 via the object lens 2, has a reflection plane to lead the light with bending the optical axis direction of the object lens 2 at 90 degree. This bend of 90 degree is for the purpose of structuring a thin optical head device. The mirror 4 is not necessarily required as a function of an optical system. However, the optical system without the mirror inevitably becomes bigger in thickness and is virtually improbable to be built in, for example, the laptop personal computer. The direction of light bended by the mirror 4 in plain view is inevitably a direction averting a side which the actuator 3 is positioned (for example, opposite direction as in the drawings). Here the mirror 4 has, on a back of the reflection plane, a rear surface substantially parallel thereto.

The collimator lens 5 has an optical axis which matches the optical axis bent by the mirror 4, and is positioned opposed to the mirror 4. The collimator lens 5 collimates an emitted light to the record surface of the optical disc 1, while functioning conversely as for the reflected light. The light emitting/receiving part 6 is positioned opposed to the mirror 4 via the collimator lens 5, and conducts emitting of a predetermined wavelength light whose axis matches an optical axis of the collimator lens 5, as well as receiving of the reflected light from the optical disc 1. The predetermined wavelength is, for example, 780 nm for a CD and 650 nm for an existing DVD. A received light is converted into an electrical signal and then led to a circuit component which is not shown.

The optical system including the light emitting/receiving part 6, as well as the actuator 3, constituted as described above, are required to move integrally opposed to the optical disc 1, and are therefore incorporated in the optical base 7 which is an integrating member. Here, since the optical base 7 is required to function as a base for positioning to mount the light emitting/receiving part 6, the collimator lens 5 and so forth, in an optical component mounting area 7a, a bottom portion (or a ceiling portion, shown is an alignment of optical system components in a case of the bottom portion) is built. On the other hand, in an object lens/actuator incorporating area 7b of the optical base 7, building of such bottom portion is impossible because of the positioning of the object lens 2 and the actuator 3. The ceiling portion, if built, hampers reducing thickness of the optical head device. Therefore, the optical base 7 of a thin optical disc device inevitably has the bottom portion in the optical component mounting area 7a and is a frame in the object lens/actuator incorporating area 7b.

Consequently, in general there exists a large opening in the object lens/actuator incorporating area 7b of the optical base 7. Such a large opening is an obstacle to secure mechanical stiffness of the optical base 7. In particular, along with a recent improvement of writing speed, operation speed of the actuator 3 is getting faster, making the actuator 3 liable to become an unnecessary vibratory source. A large vibration of the optical base 7 causes micromotion of the positions of each optical system component, and may impair a necessary feature of the optical system.

In this embodiment, the mirror 4 has, on the back of the reflection plane, the rear surface substantially parallel thereto, as described above. More specifically, a cross-sectional shape of the mirror 4 is not the right triangle, with the right angle part being recessed. In a new space made by this recess, a beam (not shown) crossing the frame (opening) of the optical base 7 is built. According to such a structure, an inside frame area of the optical base 7 is divided into an actuator incorporating opening and a mirror incorporating opening in the object lens/actuator incorporating area 7b. As a result, mechanical stiffness of the optical base 7 is largely improved and enhanced.

Figure 2A:
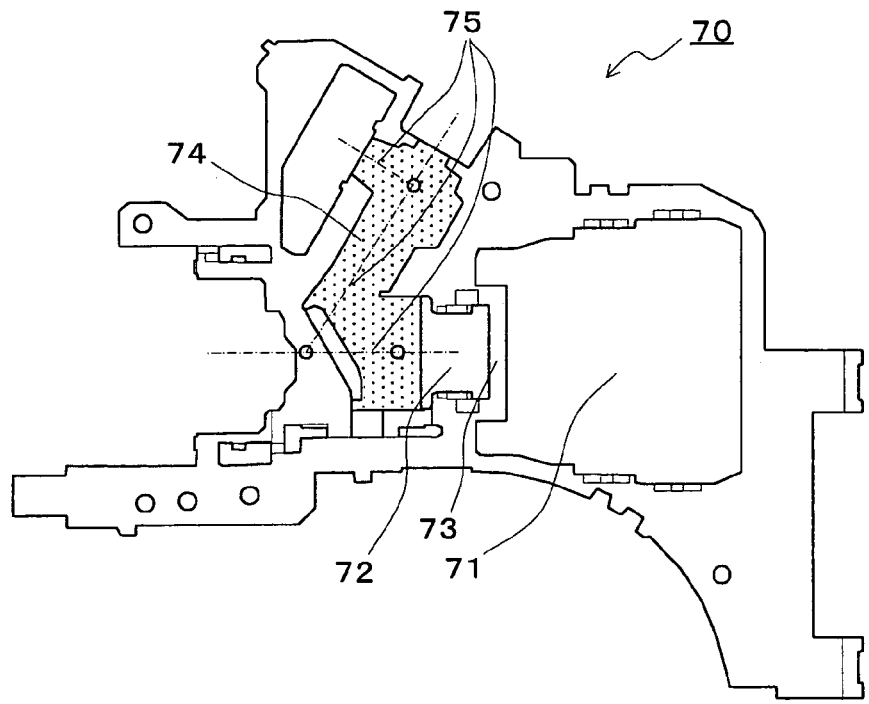
FIG. 2A and FIG. 2B are plan views which schematically show a structure of an optical head device according to an embodiment of the present invention.
Figure 2B:
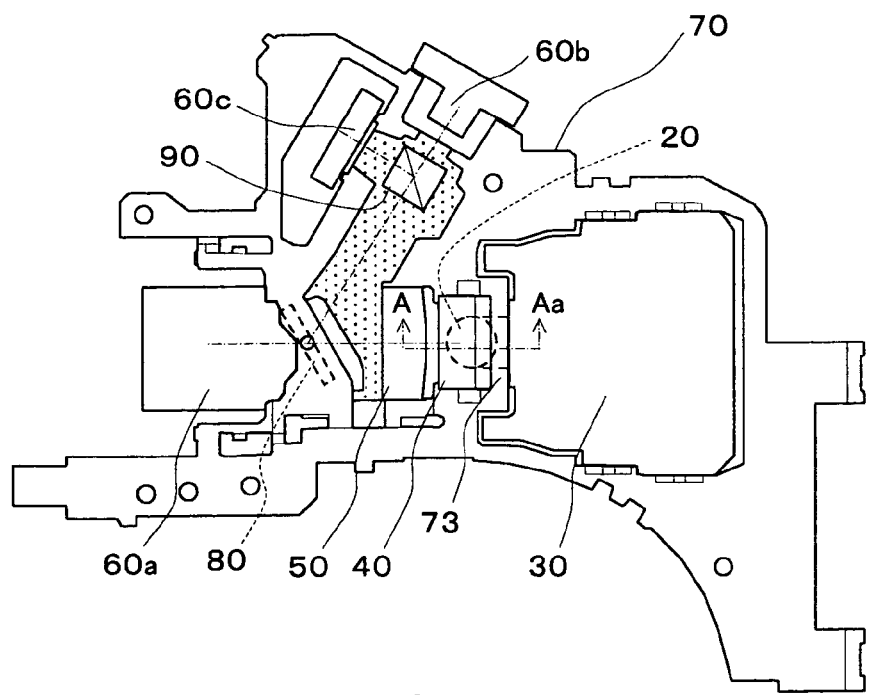

Next, more practical case will be explained with reference to FIG. 2A and FIG. 2B. FIG. 2A and FIG. 2B are plan views which schematically show a structure of an optical head device according to an embodiment of the present invention. FIG. 2A shows only an optical base 70, while FIG. 2B shows each optical component 20, 40, 50, 60a, 60b, 60c, 80, and 90, as well as an actuator 30 being incorporated therein. Each of FIG. 2A and FIG. 2B is in the same vertical and horizontal alignment as FIG. 1B.

As shown in FIG. 2A, the optical base 70 bears a shape which has an actuator incorporating opening 71 and a mirror incorporating opening 72, which are divided by a beam 73. The optical base 70 further has an optical component mounting bottom portion 74 (an area shown by a dot pattern). Incidentally, a reference numeral 75 is an optical path to be established. This embodiment is for a so-called combo optical disc apparatus, and two light-emitting sources and two light-receiving parts can be incorporated.

When each component is incorporated, as shown in FIG. 2B, the optical base 70 has, as the optical components, an object lens 20, a mirror 40, a collimator lens 50, a light emitting/receiving part for CD 60a, a light-emitting source for DVD 60c, a dichroic mirror 80, and a half mirror 90, as well as an actuator 30 which displaces the object lens 20.

The actuator 30 is incorporated within the actuator incorporating opening 71 of the optical base 70, and the mirror 40 is incorporated likewise within the mirror incorporating opening 72. The object lens 20 is supported by the actuator 30 and positioned beneath the mirror 40. In a recessed portion of the rear surface side of the mirror 40, the beam 73 of the optical base 70 is positioned. The actuator 30 and the mirror 40 are fixed respectively to the optical base 70 with adhesive filled between upside/downside of the optical base 70 shown in the drawings. The mirror 40 is positioned fixed to the optical base 70 with the adhesive and is apart from the beam 73.

The collimator lens 50 is positioned fixed, opposed to the mirror 40, to the optical component mounting bottom portion 74. The dichroic mirror 80 is positioned fixed, opposed to the collimator lens 50, to the portion with a ceiling in the optical base 70. The dichroic mirror 80 is a mirror which transmits or reflects a light according to a wavelength, and here transmits the light of wavelength 780 nm for a CD and reflects the light of wavelength 650 nm for a DVD.

The light emitting/receiving part for CD 60a being positioned behind the dichroic mirror 80, emits a laser light of wavelength 780 nm for a CD along a predetermined optical path and also receives a reflected light from an optical disc and then converts it to an electrical signal. The light emitting/receiving part for CD 60a is integrated as a light emitting/receiving element, inside which an optical path of an emitted light and an optical path of a received light are divided by a hologram element, and positions of a light-emitting source and a light-receiving element are apart from each other.

Further, on a reflection side of the dichroic mirror 80, the half mirror 90, the light-emitting source for DVD 60b, and the light-receiving part for DVD 60c are positioned. The half mirror 90 is positioned fixed on the optical component incorporating bottom portion 74 of the optical base 70. On a transmission side of the half mirror 90 the light-emitting source for DVD 60b is incorporated, while on a reflection side thereof the light-receiving part for DVD 60c is incorporated. The light-emitting source for DVD 60b emits a laser light of wavelength 650 nm for a DVD along a predetermined optical path. The light-receiving part for DVD 60c receives a reflected light from the optical disc, converting it to the electrical signal.

According to the above structure of the optical head device, when a CD is used as the optical disc, the light of wavelength 780 nm emitted by the light-emitting source for CD 60a transmits the dichroic mirror 80, and then is collimated by the collimator lens 50, reflected by the mirror 40, focused to a spot by the lens 20, and irradiated on a record surface of the optical disc (CD). The reflected light from the record surface reaches, by a reverse route thereof, the light-receiving element in the light-receiving part for CD 60a.

When a DVD is used as the optical disc, the light of wavelength 650 nm emitted by the light-emitting source for DVD 60b transmits the half mirror 90, and then is reflected by the dichroic mirror 80, collimated by the collimator lens 50, reflected by the mirror 40, focused to a spot by the lens 20, and irradiated on the record surface of the optical disc (DVD). The reflected light from the record surface travels by a reverse route thereof via the lens 20 and is reflected by the half mirror 90 before reaching the light receiving part for DVD 60c.

In this embodiment, a vibration by the actuator 30 transfers, via the adhesive applied on upside/downside of the actuator 30 shown in the drawings, to the optical base 70 and causes a deformation (torsion or bend) of the optical base 70. However, existence of the beam 73 considerably reduces a degree of such deformation. Stated in the other way, it is because a shape of the optical base 70 without the beam 73, with the actuator incorporating opening 71 and the mirror incorporating opening 72 being connected, is large as one opening, and is mechanically easy to be deformed. Moreover, since the positioning of the beam 73 is in the recessed portion of the rear surface side of the mirror 40, there is an advantage that a size (thickness, vertical size, horizontal size) of the optical head device is not at all affected.

Figure 3A:
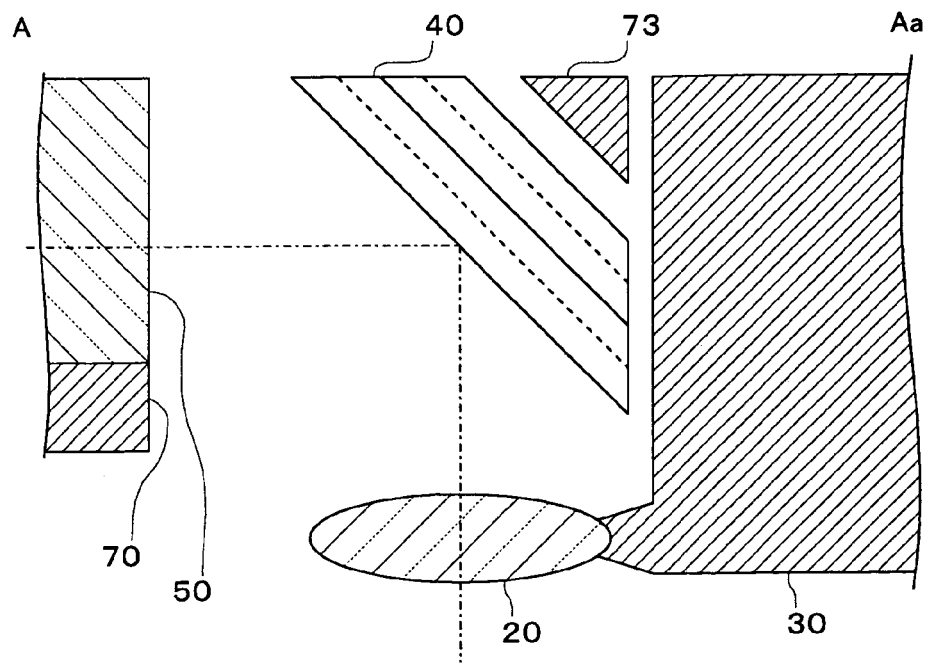
FIG. 3b is a sectional view taken along the A-Aa line in FIG. 2B.
Figure 3B:
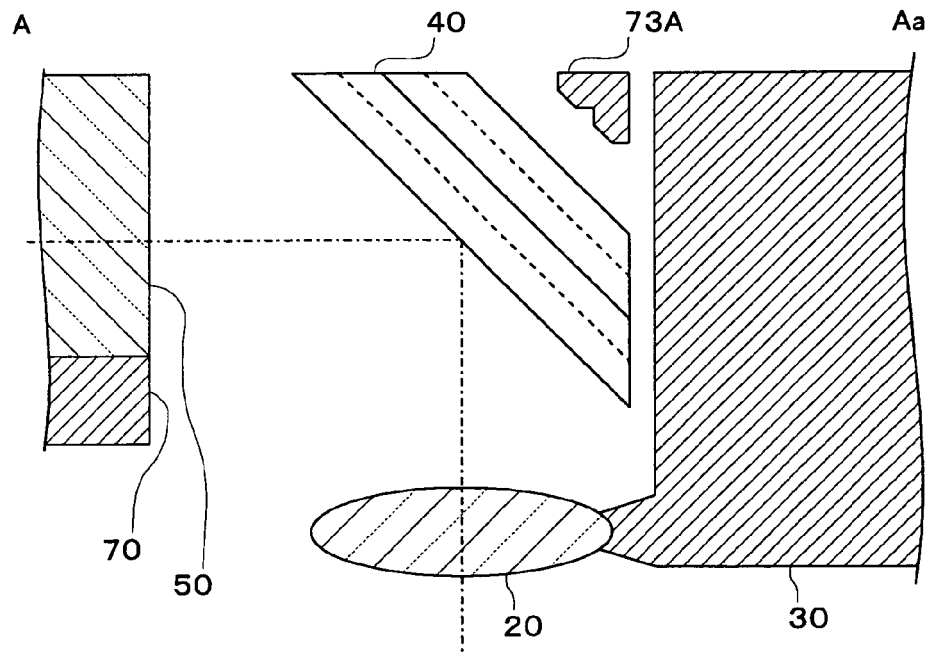

Each of FIG. 3A and FIG. 3b is a sectional view taken along the A-Aa line in FIG. 2B, and two examples are presented as shown in FIG. 3A and FIG. 3B. In FIG. 3A and FIG. 3B, the same reference numerals and symbols are used to designate the same elements as those shown in FIG. 2B.

In the example shown in FIG. 3A, a cross-sectional shape of the beam 73 is a right triangle. On the other hand, in the example shown in FIG. 3B, the cross-sectional shape of the beam 73 is a shape which is included in the right triangle having the hypotenuse substantially parallel to the rear surface of the mirror and at the same time a shape which has a recessed portion on a side of the hypotenuse of the right triangle. The cross-sectional shape of the beam 73 shown in FIG. 3 is simple, but rather unsuitable for molding the optical base 70.

More specifically, molding requires a mold, which is usually made by cutting of metal. Cutting hear means to gauge out a concave according to the shape of the necessary optical base 70, and formation of a diagonal surface as shown in FIG. 3A is more difficult (complex). On the other hand, the shape shown in FIG. 3B has little diagonal surface, so that cutting is efficiently completed. Incidentally, for the main material of the optical base 70 made by molding, zinc is suitable in terms of low cost. Materials mainly containing aluminum or magnesium maybe also used though cost performance thereof is lower than that of zinc.

The present invention is not limited to the specific forms described here with the illustrations, but it is to be understood that all the changes and modifications without departing from the range of the following claims are to be included therein.

What is claimed is:

1. An optical head device, comprising:
   an object lens;
   an actuator configured to displace the object lens;
   a mirror having a reflection plane to bend a direction of a light traveling along an optical axis of the object lens, and, on a back of the reflection plane, having a rear surface substantially parallel to the reflection plane; and
   an optical base having a first opening to accommodate the actuator, a second opening to accommodate the mirror, and a beam at a position opposed to the rear surface of the mirror, the beam being positioned to separate the second opening from the first opening in the optical base.

2. The optical head device as set forth in claim 1, wherein a cross-sectional shape of the beam of the optical base comprises a right triangle having a hypotenuse substantially parallel to the rear surface of the mirror.

3. The optical head device as set forth in claim 1, wherein a cross-sectional shape of the beam of the optical base has a shape that is included in a right triangle having a hypotenuse substantially parallel to the rear surface of the mirror, and has a recessed portion on a side of the hypotenuse.

4. The optical head device as set forth in claim 1, wherein the beam of the optical base is positioned apart from the rear surface of the mirror.

5. The optical head device as set forth in claim 1, further comprising,
   a first light-emitting source to emit a light of a first wavelength which is positioned opposite to the object lens along a reflected light path of the mirror, and
   a second light-emitting source to emit a light of a second wavelength different from the first wavelength which is positioned apart from the first light-emitting source and is positioned opposite to the object lens along a reflected light path of the mirror.

6. The optical head device as set forth in claim 1, wherein the optical base consists essentially of zinc.

* * * * *